(12) United States Patent
Amidi

(10) Patent No.: US 9,880,747 B2
(45) Date of Patent: *Jan. 30, 2018

(54) APPARATUS, SYSTEM, AND METHOD OF LOGICAL ADDRESS TRANSLATION FOR NON-VOLATILE STORAGE MEMORY

(71) Applicant: Xitore, Inc., Mission Viejo, CA (US)

(72) Inventor: Mike Hossein Amidi, Lake Forest, CA (US)

(73) Assignee: XITORE, INC., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,682

(22) Filed: Jun. 21, 2017

(65) Prior Publication Data

US 2017/0285947 A1   Oct. 5, 2017

Related U.S. Application Data

(63) Continuation of application No. 15/202,408, filed on Jul. 5, 2016, now Pat. No. 9,715,342.

(60) Provisional application No. 62/188,602, filed on Jul. 3, 2015.

(51) Int. Cl.
*G11C 29/18* (2006.01)
*G06F 3/06* (2006.01)
*G06F 12/00* (2006.01)

(52) U.S. Cl.
CPC ............ *G06F 3/061* (2013.01); *G06F 3/0608* (2013.01); *G06F 3/0631* (2013.01); *G06F 3/0688* (2013.01); *G06F 12/00* (2013.01)

(58) Field of Classification Search
CPC ............ G11C 2029/1806; G06F 3/061; G06F 3/0608; G06F 12/00; G06F 3/0631; G06F 3/0688

See application file for complete search history.

(56) References Cited

U.S. PATENT DOCUMENTS

| 3,970,999 | A | | 7/1976 | Elward | |
|---|---|---|---|---|---|
| 4,737,909 | A | | 4/1988 | Harada | |
| 5,835,963 | A | * | 11/1998 | Yoshioka | G06F 12/1054 365/49.17 |
| 6,026,467 | A | * | 2/2000 | Petty | G06F 12/0802 707/E17.035 |
| 2001/0055458 | A1 | | 12/2001 | Ladd | |
| 2009/0013148 | A1 | * | 1/2009 | Eggleston | G06F 12/0246 711/203 |

(Continued)

*Primary Examiner* — Khamdan Alrobaie
(74) *Attorney, Agent, or Firm* — Fish IP Law, LLC

(57) ABSTRACT

A fast and lean way of performing logical-to-physical address translation is presented. A logical address is divided into a most significant bits portion and a least significant bits portion. Instead of using the entire logical address to locate an entry in an address translation table, only the most significant bits portion of the logical address is used, which substantially reduces the size of the address translation table. The entry includes a most significant bits portion of a physical volatile memory address and a most significant bits portion of a physical non-volatile memory address. The actual physical volatile memory address and the actual physical non-volatile memory address can be derived by combining the most significant bits portions of the addresses stored in the address translation table entry with the least significant bits portion of the logical address.

14 Claims, 7 Drawing Sheets

(56) References Cited

U.S. PATENT DOCUMENTS

| | | | |
|---|---|---|---|
| 2011/0055458 A1* | 3/2011 | Kuehne | G06F 12/0246 |
| | | | 711/103 |
| 2012/0215965 A1 | 8/2012 | Inada et al. | |
| 2013/0311711 A1 | 11/2013 | Yang et al. | |
| 2013/0318322 A1* | 11/2013 | Shetty | G06F 3/0665 |
| | | | 711/172 |

* cited by examiner

APPARATUS, SYSTEM, AND METHOD OF LOGICAL ADDRESS TRANSLATION FOR NON-VOLATILE STORAGE MEMORY

This application claims the benefit of pending U.S. patent application Ser. No. 15/202,408 filed on Jul. 5, 2016, which claimed priority to U.S. provisional application No. 62/188,602, filed Jul. 3, 2015. This and all other extrinsic references referenced herein are incorporated by reference in their entirety.

FIELD OF THE INVENTION

The field of the invention is non-volatile memory devices

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Computer systems ("host systems" or "host computer systems") utilize non-volatile storage to store data. The data can then be retrieved, fetched, analyzed, processed, and restored by one or more computer system in the future. The main advantage to store data in non-volatile storages is for persistently storing data, which allows access to the data after power cycling of the host computer system and allows other computer systems to access the same data.

Today, due to ongoing demand for high speed data storage, digital storage units in both consumer and enterprise levels incorporate one or more internal circuitries to assist in storing and retrieving data from the associated host computer system in the non-volatile memories disposed in the storage unit. The internal circuitries enable the non-volatile storage unit to process large amount of host system data more efficiently.

The host system provides a set of logical addresses to represent different sectors in a logical memory. Each logical address represents one distinct sector of the logical memory (the smallest size of data the operating system (OS) can read and/or write into storage units). A logical address is used by the non-volatile storage controller to store and or retrieve the requested host system data. However, due to the non-volatile storage system's architecture, and the difference among internal circuitries in different non-volatile storage systems, the host logical addresses needs to be translated into actual non-volatile storage unit's physical addresses. The difference is inherent to actual non-volatile storage elements' architecture, for example, NAND flash non-volatile storage elements have a minimum read and/or program operation (write) size of 8 kilobyte (KB) or 16 KB, while a typical OS has a sector size of 4 KB. This discrepancy requires the Non-volatile Storage unit to keep track of mappings between host system logical addresses and non-volatile physical addresses. The mappings are usually stored as a logical to physical address translation table.

As an example, on the event that the host system requests a read operation on one particular 4 KB sector, the corresponding non-volatile storage unit will fetch a sector having its minimum required operation data size of 16 KB and provide the host system the requested 4 KB data chunk. The remaining data within the 16 KB sector will be dumped by the non-volatile storage controller for this operation. As it is obvious to the reader, if the host system issues a series of random write operations of 4 KB each, the non-volatile storage controller needs to provide a system and method to improve this mismatch, and eliminate the waste of storage unit individual internal sectors due to this large size discrepancy.

Today, many non-volatile storage controllers provide internal tables to keep track of the mappings between host system logical addresses and non-volatile storage physical addresses to resolve the sector size differences. The main issue with these tables is that as the size of non-volatile storage units increases, the logical to physical address translation table size will increase linearly. For example, a 4 terabyte (TB) non-volatile storage capable of processing 4 KB sectors will require a table with 1 billion row entries, where each row is capable of holding a logical address, a physical address, and some additional bits for housekeeping, which translates to a translation table size in excess of 4 gigabyte (GB) in size. The controller needs to have large enough size of internal memory to keep track of this translation and any additional data move around within the non-volatile storage unit due to the non-volatile Storage elements' architecture, and needs at all time the non-volatile storage unit be powered up and fully functional.

The address translation operation is required for each and every host system operation request. Collective, they increase processing time (latency), lower overall bandwidth (speed), increase overall product power consumption, increased overall thermal usage of product, and increase the total cost of operation of a non-volatile storage unit.

Thus, there remains a need for a system and method that improves the speed and memory usage of logical to physical address translation within a non-volatile storage unit.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods to provide a fast and lean way to perform logical to physical address translation within a non-volatile storage unit. Instead of providing an address translation table having a number of entries that grows linearly with the number of possible logical addresses available for a given non-volatile storage unit size, an address translation table having a size that is exponentially reduced from the number of possible logical addresses is provided.

In some embodiments, a non-volatile storage system provides an address translation table having entries for only a portion of the possible available logical addresses for its non-volatile memories. Specifically, instead of using the entire logical address to retrieve an entry within the address translation table, the non-volatile storage system of some embodiments use only a portion of the logical address as a primary key to retrieve an entry from the address translation table. In some of these embodiments, the non-volatile storage system uses the most significant bits of the logical address to retrieve an entry from the address translation table. Thus, the non-volatile storage system only needs a translation table to hold as many variation as the most significant bits of the logical address allows, which tremendously reduce the size of the table from conventional systems and methods.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
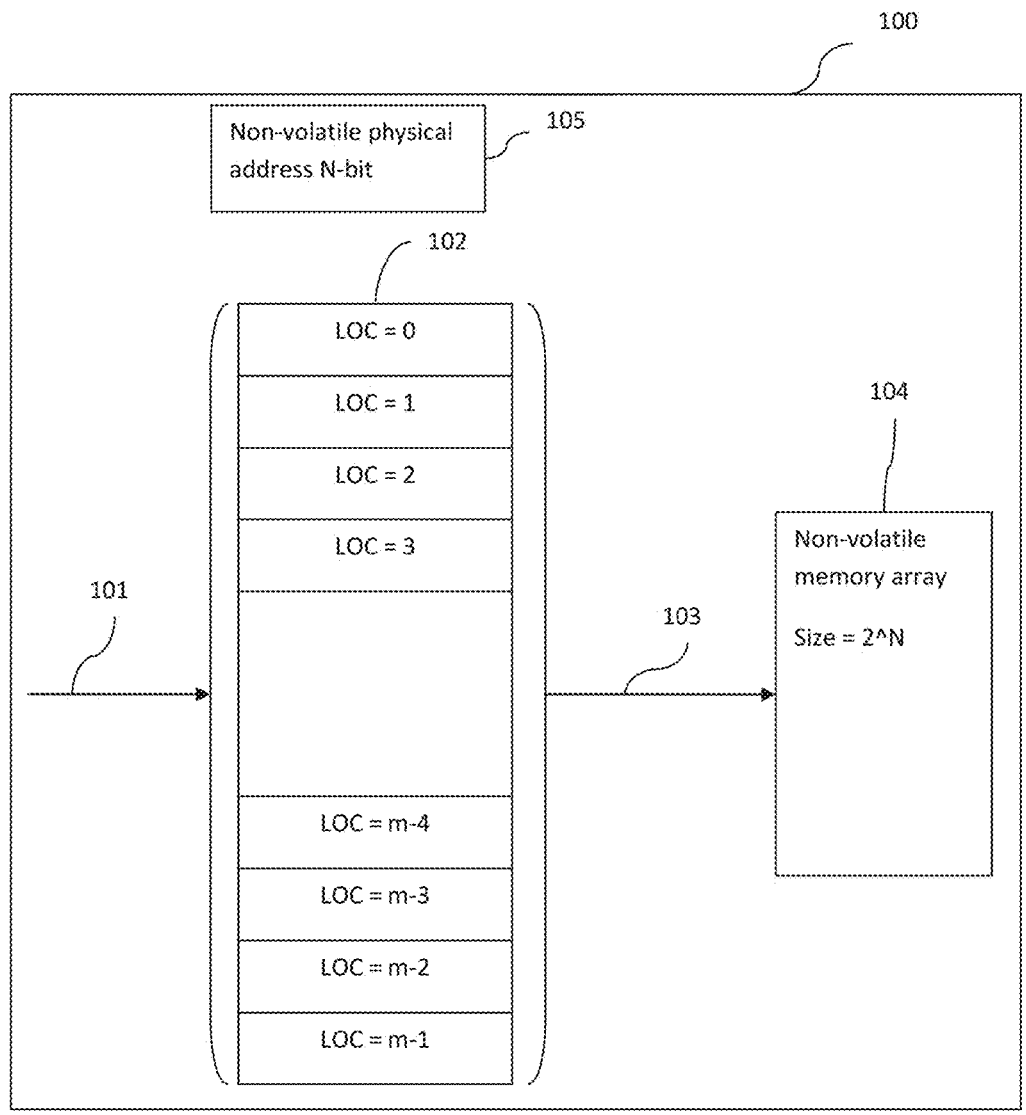
FIG. 1 illustrates how a conventional non-volatile storage system performs logical-to-physical address translation.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. As used herein, the term "operatively coupled to" refers to electronic components that are coupled with one another such that an electronic communication path exists between one electronic hardware component and another electronic hardware component.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. A "host" computer system is a functional computer system having a processor and motherboard to which a storage unit could be operatively coupled to in order to serve as a computer-readable medium for the computer system. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

The inventive subject matter provides apparatus, systems, and methods to provide a fast and lean way to perform logical to physical address translation within a non-volatile storage unit. Instead of providing an address translation table having a number of entries that grows linearly with the number of possible logical addresses available for a given non-volatile storage unit size, an address translation table having a size that is exponentially reduced from the number of possible logical addresses is provided.

In some embodiments, a non-volatile storage system provides an address translation table having entries for only a portion of the possible available logical addresses for its non-volatile memories. Specifically, instead of using the entire logical address to retrieve an entry within the address translation table, the non-volatile storage system of some embodiments use only a portion of the logical address as a primary key to retrieve an entry from the address translation table. In some of these embodiments, the non-volatile storage system uses the most significant bits of the logical address to retrieve an entry from the address translation table. Thus, the non-volatile storage system only needs a translation table to hold as many variation as the most significant bits of the logical address allows, which tremendously reduce the size of the table from conventional systems and methods.

FIG. 1 illustrates a conventional non-volatile storage system 100 that performs address translation. The non-volatile storage system 100 includes a host system logical address bus 101, a non-volatile storage controller logical to physical address translation table block 102, a non-volatile storage controller address translation blocks physical address bus 101, and a non-volatile memory array 104. As shown, for a computing system that has m number of variations of logical addresses, the non-volatile storage system 100 needs to have an address translation table 102 having m number of entries. In this example, each entry includes a physical address that corresponds to a logical address for that entry. FIG. 1 also illustrates an example entry content 105 that shows a logical address having n bits. Thus, the translation table 102 has a size of m by n bits.

Figure 2:
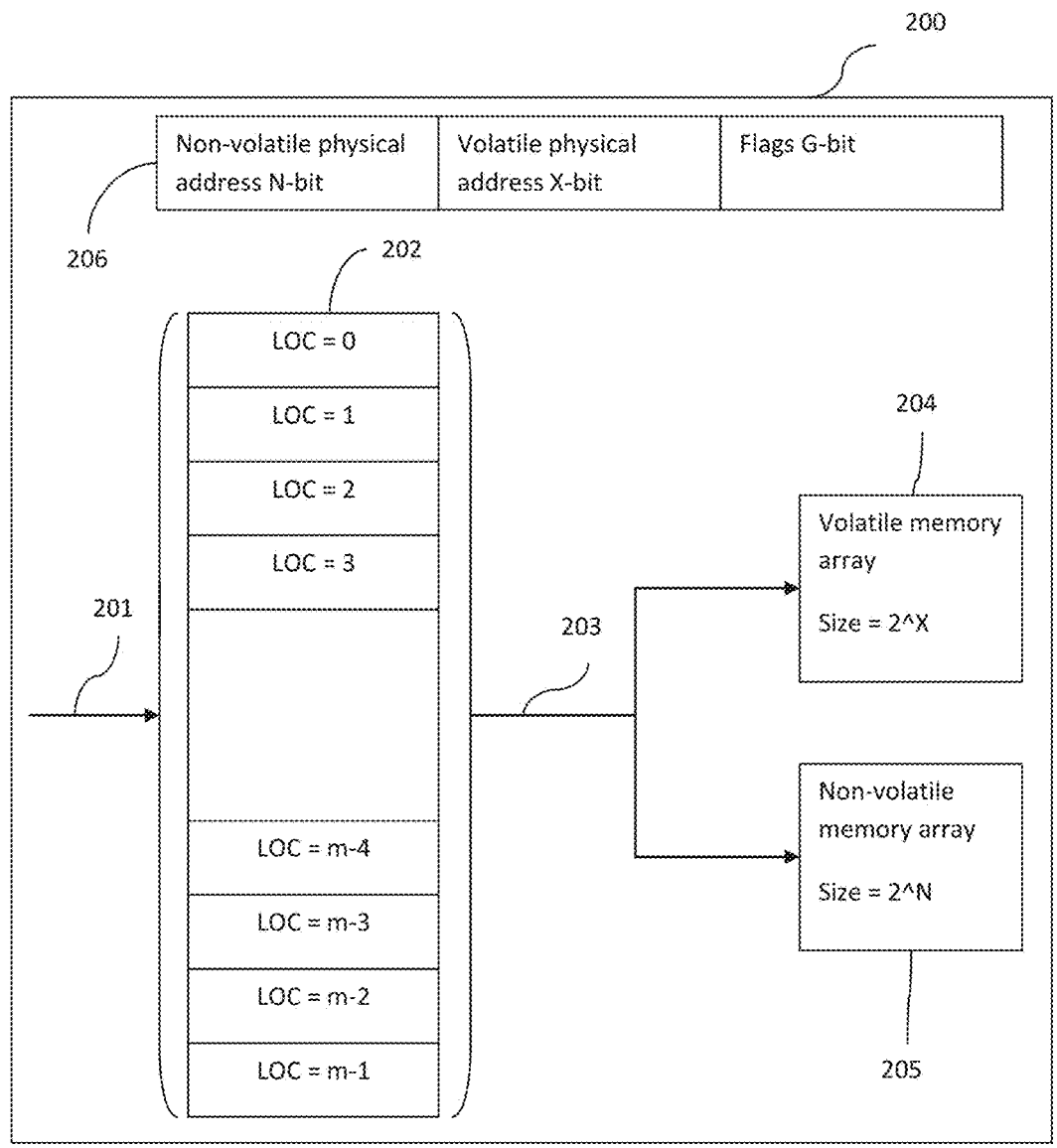
FIG. 2 illustrates how another conventional non-volatile storage system performs logical-to-physical address translation.

FIG. 2 illustrates another conventional non-volatile storage system 200 that performs address translation. The non-volatile storage system 200 is similar to the non-volatile storage system 100, except that the non-volatile storage system 200 also has an internal volatile memory, and it is also enabled to cache data in the internal volatile memory. The non-volatile storage system 200 includes a host system logical address bus 201, a non-volatile storage controller logical to physical address translation table block 202, a non-volatile storage controller address translation blocks physical address bus 203, a volatile memory array 204, and a non-volatile memory array 205 Similar to the address translation table 102, the address translation table 202 also has m number of entries, where m equals to the number of variations of logical address for the computing system. In addition to the non-volatile physical memory address, each entry in the translation table 202 includes a volatile physical memory address that points to a location in the volatile memory array 204 that store a cached copy of data, as shown in entry 206.

Figure 3:
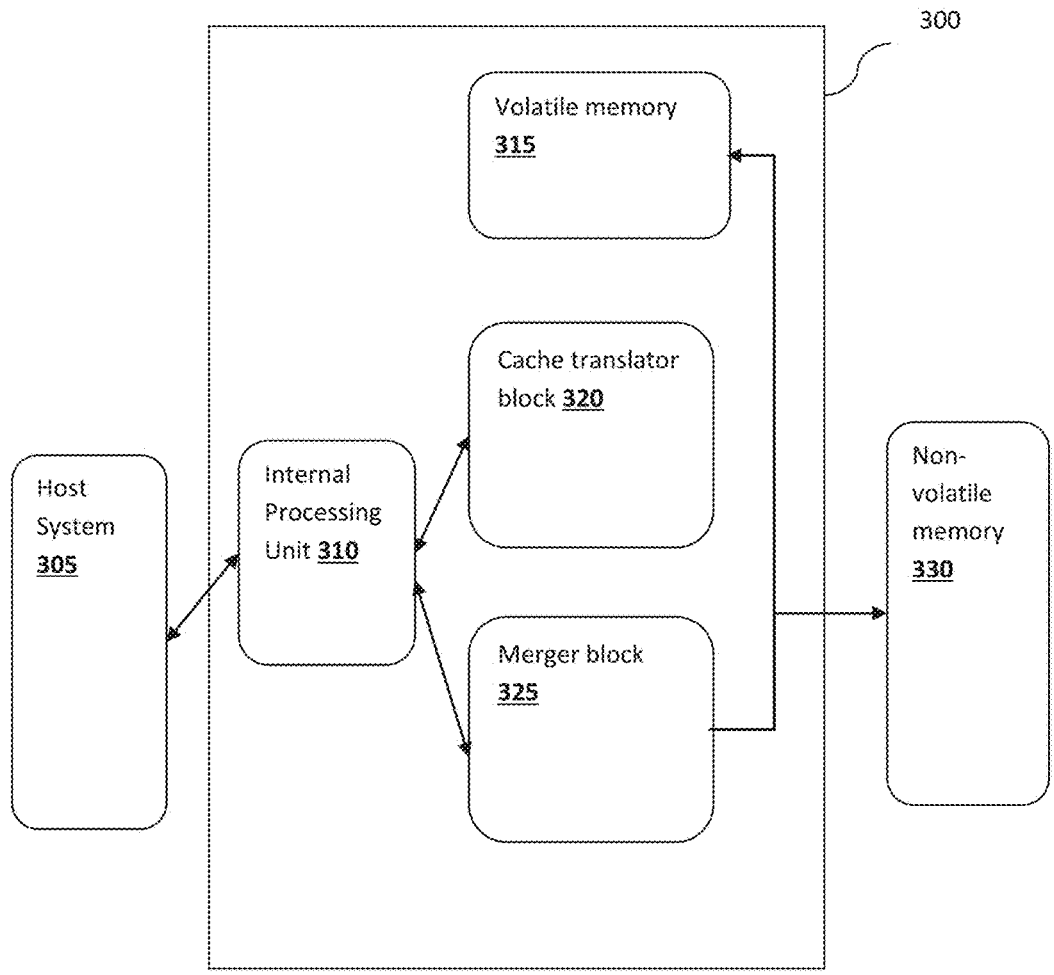
FIG. 3 is a schematic of a non-volatile storage controller of some embodiments.

Both of the non-volatile storage systems 100 and 200 suffer from having to store a large address translation table, which size is linear to the number of logical address variations. It is contemplated that having an address translation table size that does not grow linearly as the non-volatile memory capacity increases. Preferably, the address translation table has a number of entries that is substantially less than the number of logical address variations. FIG. 3 illustrates a non-volatile storages controller 300 of some embodiments that provides a fast and lean way for address translation. The non-volatile storages system 300 includes an internal processing unit 310, an internal volatile memory 315, a cache translation block 320, and a merger block 325.

The non-volatile storage controller 300 is part of a non-volatile storage system having a non-volatile memory 330. The non-volatile storage system is communicatively coupled with a host system 305, for example, via a north/south bridge or a short range communication interface (e.g., USB connection, Bluetooth connection, etc.).

A host system as used herein is defined as an electronic system that includes a motherboard. In some embodiments, the host system includes at least one processing unit (e.g., a processor, a processing core, etc.) and at least one volatile memory (e.g., dynamic random-access memory (DRAM), etc.) disposed on the motherboard, and the motherboard facilitates the communications between the processing unit, the volatile memory and other peripherals (such as the non-volatile storage system as disclosed herein, graphics card, etc.).

As used herein, a "north bridge" is a chip in the chipset of the motherboard that connects high speed buses, such as an FSB (front-side bus), a main memory bus, and/or a PCIe bus. As used herein a "south bridge" is another chip in the chipset of the motherboard that connects slower busses, such as a PCI bus, a USB (universal serial bus), and a SATA bus. The north bridge and the south bridge could be operationally coupled to one another using a DMI (direct media interface) bus.

The internal processing unit 310 is communicatively coupled with a host system 305, for example, via a north/south bridge or a short range communication interface (e.g., USB connection, Bluetooth connection, etc.). The internal processing unit 310 of some embodiments can be a processor (or a processing core) such as an Intel® Core i7, an AMD Athlon processor, etc. or any other types of programmable chip that can be programmed (by executing a software program) to perform a set of functions for the non-volatile storage controller 300. In other embodiments, the internal processing unit 310 is a finite state machine (i.e., non-programmable hardware based digital logic circuits) configured to perform a set of functions for the non-volatile storage controller 300. The internal processing unit 310 is configured to receive operation requests that includes a logical memory address associated with the non-volatile storage controller 300 from the host system 305. Examples of such operation requests include a read request, an erase request, a write request, and any other data storage related requests. Each request is usually accompanied by a logical memory address to indicate a location in the array of non-volatile memories on which to operate the operation request.

The internal volatile memory 315 can be any type of volatile memory unit such as dynamic random-access memory (DRAM), etc. Additionally, the non-volatile memory can be any type of memory unit that allows for persistent data storage, such as a NAND flash, phase changed memory (PCM), magneto resistive memory (MRAM), or any other non-volatile storage drive.

Both of the cache translator block 320 and the merger block 325 can be implemented as hardware components that include resisters, transistors, etc. configured to perform different aspect of the address translation function for the non-volatile storage controller 300.

In some embodiments, when the internal processing unit 310 receives a logical memory address (e.g., as part of a data operation request) from the host system 305, the internal processing unit 310 is configured to use the cache translator block 320 and merger block 325 to generates at least one of a volatile physical memory address that points to a location in the volatile memory 315 that stores a copy of data corresponding to the received logical address, and a non-volatile physical memory address that points to a location in the non-volatile memory 330 that stores a copy of data corresponding to the received logical address.

Figure 4:
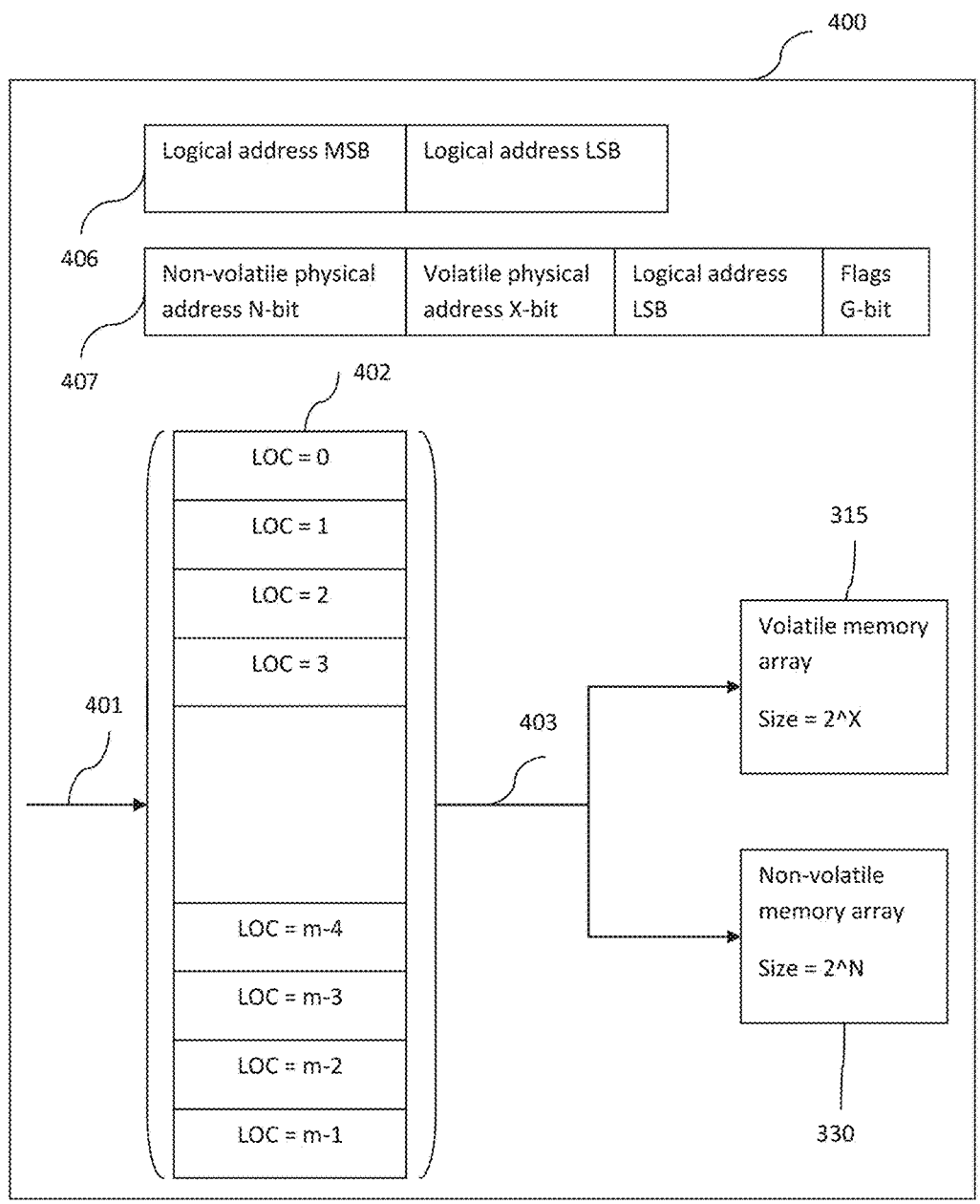
FIG. 4 illustrates how a non-volatile storage controller of some embodiments performs logical-to-physical address translation.

In some of these embodiments, the internal processing unit 310 is configured to generate, and subsequently use, an address translation table. The address translation table will enable the internal processing unit 310 to map a logical memory address to a physical memory address. In some embodiments, the size of the address translation table (number of entries) is substantially less than the number of possible logical address variations for the system. The operation of generating (filling in content to) the address translation table and address translation performed by the non-volatile storage controller 300 will be described by reference to FIG. 4. FIG. 4 shows an address translation table 402 and an example logical memory address 406 that the host system 305 sends to the non-volatile storage controller 300 for processing.

Instead of using the entire logical address to retrieve an entry from the address translation table, the internal processing unit 310 is configured to first divide the logical memory address into two portions—a most significant bits (MSB) portion and a least significant bits (LSB) portion. For example, for a logical address having 30 bits long, the internal processing unit 310 of some embodiments can divide the logical memory address into a most significant bits portion having the first 21 bits and a least significant bits portion having the remaining (last) 9 bits. It is noted that this is just an example way of dividing the logical memory address, it is conceived that the internal processing unit 310 can divide the logical memory address in any other ways (e.g., first 10 bits and last 20 bits, first 25 bits and last 5 bits, etc.). Preferably, the MSB portion is larger than the LSB portion.

The internal processing unit is configured to then use only the MSB portion of the logical memory address to locate an entry within the address translation table 402. Using only a portion of the memory address to generate and locate entries within the address translation table substantially reduce the size of the address translation table. In this example of a logical address scheme having 30-bit logical memory address, using a conventional address translation table that takes the entire logical memory address to generate/locate entries in the table would require the address translation table to have $2^{30}$ entries. On the other hand, an address translation table generated using only the MSB portion (e.g., 21 bits) of the logical address would require only $2^{21}$ entries, which is a substantial reduction from the $2^{30}$ entries.

It has been contemplated that with enough logical address variations, it will take a long time (or possibly never) to use up all possible address variations, especially if a large enough MSB portion is selected (e.g., 21 bits or larger). It has also been contemplated that the internal processing unit 310 is configured to generate two, four, eight, sixteen or more of these address translation tables 402 to correspond to different logical addresses having the same MSB portion. In addition to size, another characteristics of the address translation table 402 in some embodiments is that the content of each entry in the address translation table 402 includes, as shown in example address translation table entry 407 that corresponds to the MSB portion of a logical memory address, a non-volatile physical memory section, a volatile physical memory section, a logical address LSB section, and a flags section.

Content in the non-volatile physical memory section can be used to generate a non-volatile physical memory address that corresponds to the logical memory address in the address translation process. Content in the volatile physical memory section can be used by the internal processing unit 310 to generate a volatile physical memory address that corresponds to the logical memory address in the address translation process. Content in the logical address LSB section can be used by the internal processing unit 310 to match a specific logical address having the MSB portion. The flags section includes several flags that can be used by the internal processing unit 310 to determine whether the internal processing unit 310 should retrieve content from the non-volatile memory 330 of the non-volatile storage system, from the volatile memory 315 of the non-volatile storage system, or create a new entry for the logical memory address.

When the internal processing unit 310 receives the logical memory address and extracts the MSB portion of the logical memory address, the internal processing unit 310 is configured to retrieve (or pull) entries from these address translation tables 402 that correspond to the MSB portion. Specifically, the internal processing unit 310 is configured to retrieve one entry from each of the tables 402, where that entry is a unique entry in that table that corresponds to the MSB portion.

There are four possible scenarios when the entries are retrieved—the logical address has not been accessed, a volatile memory address can be used to retrieve content associated with the logical memory address, a non-volatile memory address can be used to retrieve content associated with the logical memory address, and both the volatile memory address and the non-volatile memory address can be used to retrieve content associated with the logical memory address. In some embodiments, the internal processing unit 310 can make a determination of which scenario applies by checking the logical address LSB section and the flags in the flags section of the entry (e.g., volatile memory flag, non-volatile memory flag, etc.). If none of the retrieved entries includes a logical address LSB (from the logical address LSB section) that matches the LSB portion of the logical memory address, the internal processing unit 310 can determine that the logical address has not been accessed before.

In this scenario, the internal processing unit 310 is configured to assign, to the logical memory address, a new non-volatile physical address based on the LSB portion of the logical memory address. In some embodiments, the internal processing unit 310 can do this by generate a MSB portion of this new non-volatile physical address (e.g., randomly generated, next available, etc.). The non-volatile physical address that is assigned to this logical memory address is the combination of the newly generated MSB portion and the LSB portion of the logical memory address. If there is any of the retrieved entries is empty, the internal processing unit 310 is configured to store this newly generated MSB portion as the non-volatile memory address section of the empty entry and store the LSB portion of the logical memory address as the logical memory LSB section of the empty entry. The internal processing unit 310 is configured to also set the non-volatile memory flag in the flags section of the empty entry to true, indicating that the non-volatile memory address stored in this entry can be used to retrieve content.

If none of the retrieved entries that correspond to the MSB portion of the logical memory address is empty, the internal processing unit is configured to create a new address translation table, and fill in the content of the entry that corresponds to the MSB portion of the logical memory address in the new table, as described above.

If the internal processing unit 310 determines that one of the retrieved entries has an LSB section that matches the LSB portion of the logical memory address, the internal processing unit 310 is configured to check the various flags in the flags section of the matched entry. The internal processing unit 310 can determine that the content associated with the logical memory address is properly stored (cached) in the volatile memory 315, if the volatile memory flag is set to true. In this scenario, the internal processing unit 310 is configured to use the cache translator block 320 and the merger block 325 to translate the logical memory address to a proper volatile memory address that points to the content associated with the logical memory address.

In some embodiments, the internal processing unit 310 is configured to retrieve the volatile physical memory address MSB from the volatile memory address section of the entry. The internal processing unit 310 is configured to then generate the proper volatile physical memory address by combining the volatile physical memory address MSB with the LSB portion of the logical memory address (e.g., by appending the LSB portion of the logical memory address to the volatile physical address MSB, etc.). Using this generated volatile physical memory address, the internal processing unit 310 is configured to retrieved data from the internal volatile memory 315 via the bus 403.

Furthermore, the internal processing unit 310 can determine that the content associated with the logical memory address is properly stored in the non-volatile memory 330 if the non-volatile memory flag in the flags section is set to true. In this scenario, the internal processing unit 310 is configured to use the cache translator block 320 and the merger block 325 to translate the logical memory address to a proper non-volatile memory address that points to the content associated with the logical memory address.

In some embodiments, the internal processing unit 310 is configured to retrieve the non-volatile physical memory address MSB from the non-volatile memory address section of the entry. The internal processing unit 310 is configured to then generate the proper non-volatile physical memory address by combining the non-volatile physical memory address MSB with the LSB portion of the logical memory address (e.g., by appending the LSB portion of the logical memory address to the non-volatile physical address MSB, etc.). Using this generated non-volatile physical memory address, the internal processing unit 310 is configured to retrieved data from the non-volatile memory 330 via the bus 403.

In some embodiments, after retrieving the content from the non-volatile memory 330 according to the generated non-volatile physical memory address, the internal processing unit 310 is also configured to store (cache) the content in the internal volatile memory 315. In some of these embodiments, the internal processing unit 310 is configured to store the content in a location of the internal volatile memory 315 having a volatile memory address with a LSB portion that matches the LSB of the logical address. Furthermore, the internal processing unit 310 is configured to store the volatile memory address in the volatile memory address section of the entry in the address translation table 402, and set the volatile memory flag in the flags section of the entry to true.

In some embodiments, if both the volatile memory flag and the non-volatile memory flag are true, the internal processing unit 310 of some embodiments is configured to retrieve from the volatile memory as it is faster.

Figure 5:
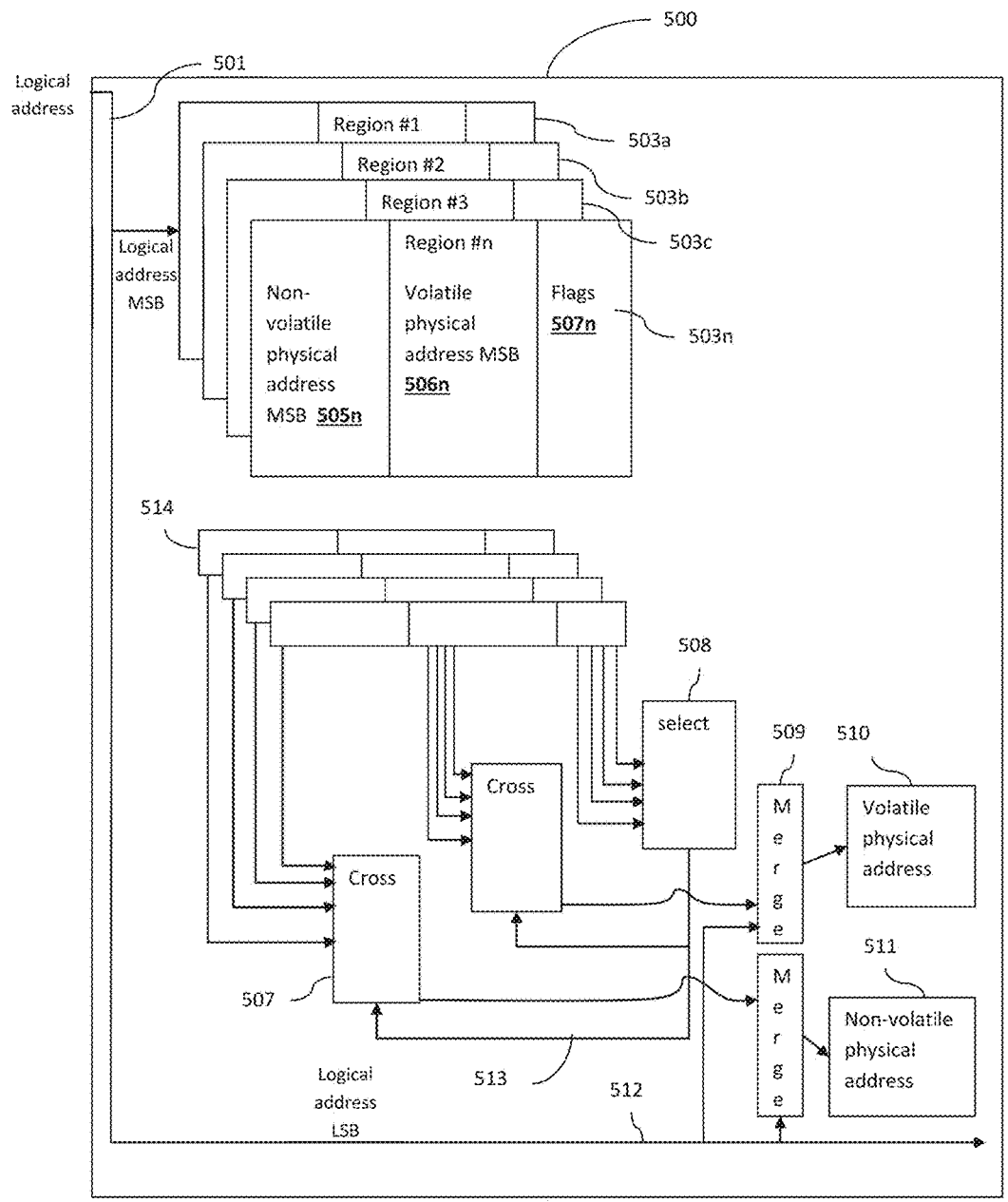
FIG. 5 illustrates how a non-volatile storage controller of some embodiments performs logical-to-physical address translation in detail.

FIG. 5 illustrates this address translation process in more detail. Specifically, FIG. 5 shows multiple address translation tables 503a-503n that the internal processing unit 310 generated. Each of the address translation tables 503a-503n includes multiple columns—a non-volatile physical memory address column (e.g., columns 505a-505n), a volatile physical memory address column (e.g., columns 506a-506n), a logical address LSB column (e.g., columns 504a-504n), and a flags column (e.g., columns 507a-507n). Using the MSB portion of a logical memory address, the internal processing unit 310 can retrieve an entry from each of the address translation tables 503a-503n. In this case, the internal processing unit 310 retrieves entries 514. Based on the flags stored in the flags section of the retrieved entries 514, the internal processing unit 310 can generate volatile memory address and/or non-volatile memory address and retrieves content from the volatile memory 510 and/or the non-volatile memory 511 by using cross blocks 507, select block 508, merge blocks 509, and buses 512 and 513.

Figure 6:
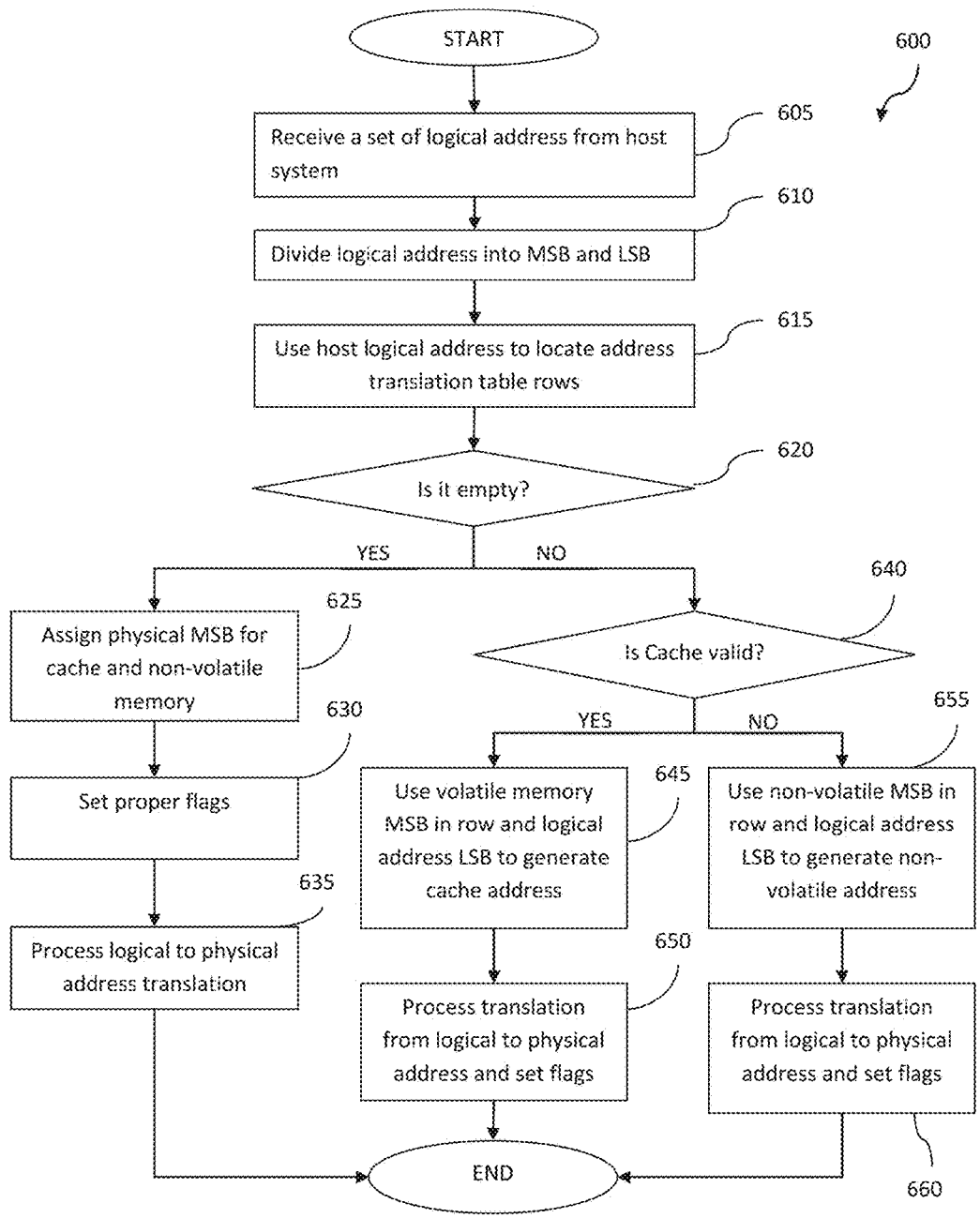
FIG. 6 illustrates an address translation process performed by a non-volatile storage controller of a non-volatile storage system of some embodiments.

FIG. 6 illustrates an address translation process 600 performed by a non-volatile storages controller of a non-volatile storage system of some embodiments that is associated with a host system. The process begins by receiving (at step 605) a logical address from the host system. The process 600 then divides (at step 610) the logical address into a most significant bits (MSB) portion and a least significant bits (LSB) portion, and uses (at step 615) only the MSB portion of the logical address to locate one or more entries in an address translation table. In some embodiments, when the address translation table is implemented in a single-way table, the process 600 would only obtain one entry. On the other hand, when the address translation table is implemented in a multi-way table (e.g., 2-way, 4-way, 8-way, 16-way, etc.), the process would obtain multiple entries based on the MSB portion of the logical address.

Upon obtaining the entries, the process 600 determines (at step 620) if any of the entry has a match with the LSB portion of the logical address. If none of the entries matches with the LSB portion of the logical address, the process 600 assigns (at step 625) a new physical non-volatile memory address and a new physical volatile memory address for storing data associated with the logical address. In some embodiments, both of the physical non-volatile memory address and the physical volatile memory address have a LSB portion that is identical to the LSB portion of the logical address, thus, the process 600 in the step only assigns the MSB portions of the volatile memory address and the non-volatile memory address. If the obtained entry is empty, the storage controller of some embodiments may store the MSB portions of the newly assigned physical non-volatile address and physical volatile address in the entry. If the entries are not empty but they do not match the logical address, the storage controller of some embodiments create another entry for this MSB portion or create another address translation sector with the same number of entries, and store the newly assigned physical addresses in the new entry.

In some embodiments, the storage controller might also store data in the locations in the non-volatile memory and volatile memory according to the newly assigned addresses, as instructed by the host system. The process 600 then sets (at step 630) the proper flags (e.g., volatile memory flag and non-volatile memory flag, etc.) in the entry to indicate that the non-volatile memory and the volatile memory (cache) have proper copies of the data associated with the logical address. In some embodiments, the process 600 completes (at step 635) the logical to physical address translation by combining the newly assigned MSB portions of the memory addresses with the LSB of the logical address to perform the data operation.

On the other hand, if it is determined at step 620 that one of the entries obtained from the address translation table matches the LSB of the logical address, the process 600 determines (at step 640) whether the data is properly stored in cache, for example, by checking the volatile memory flag in the entry. If it is determined that the data is properly stored in cache, the process 600 retrieves (at step 645) the MSB portion of the physical volatile memory address from the entry and generates (at step 650) a physical volatile memory address by combining the MSB portion of the physical volatile memory address with the LSB portion of the logical address. In some embodiments, the combining is done by appending the LSB portion of the logical address to the MSB portion of the physical volatile memory address. The process 600 then completes (at step 650) the logical to physical address translation operation, and sets the proper flags. For example, after accessing data stored in the volatile memory, the internal processing unit is configured to set the volatile memory flag in the entry to true and set the non-volatile memory flag in the entry to false to indicate that the copy of data in the non-volatile memory might not be up-to-date.

On the other hand, if it is determined that the data is properly stored in the non-volatile memory, the process 600 retrieves (at step 655) the MSB portion of the physical non-volatile memory address from the entry and generates (at step 660) a physical non-volatile memory address by combining the MSB portion of the physical non-volatile memory address with the LSB portion of the logical address. In some embodiments, the combining is done by appending the LSB portion of the logical address to the MSB portion of the physical non-volatile memory address. The process 600 then completes (at step 660) the logical to physical address translation operation and sets the proper flags in the entry. For example, after accessing the data stored in the non-volatile memory, the internal processing unit is configured to set the non-volatile memory flag to true and the volatile memory flag to false to indicate that the data in the non-volatile memory is up-to-date. If the internal processing unit also stores a copy of the data in the volatile memory (cache the data), the internal processing unit is also configured to set the volatile memory flag to true.

Figure 7:
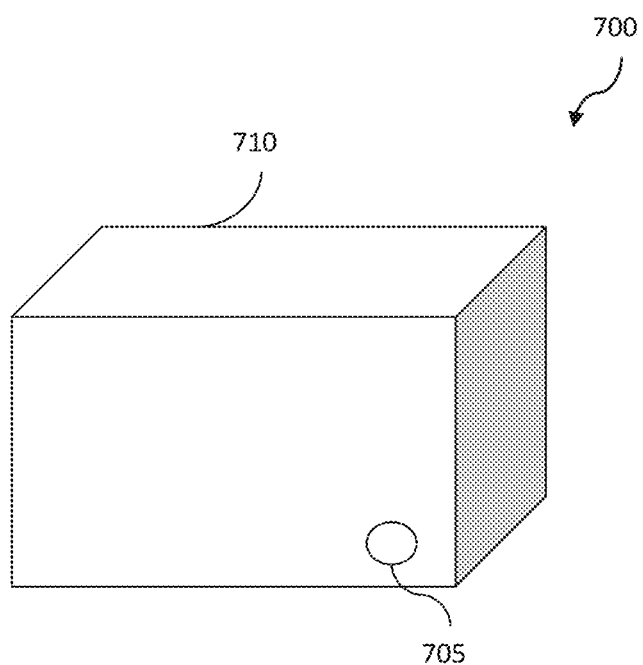
FIG. 7 shows an exemplary non-volatile storage unit of some embodiments.

In some embodiments, a non-volatile storage unit is provided. FIG. 7 illustrates an example non-volatile storage unit 700. The non-volatile storage unit 700 includes a housing 710 that encloses the elements of the non-volatile storage controller 300 and the non-volatile memory 330 of FIG. 3. In some of these embodiments, the housing exposed a host system interface 705. The host system interface 705 can be implemented as an electronic connector that is configured to connect with the host system 305.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of translating a logical address to a physical address within a non-volatile storage system comprising an array of non-volatile memories and an internal volatile memory, the method comprising:
    dividing the logical address into a most significant bits portion and a least significant bits portion;
    transmitting the most significant bits portion to multiple address translation tables;
    retrieving a set of entries comprising an entry from each of the multiple address translation tables, wherein each of the set of entries comprises:
        (a) a set of most significant bits of a non-volatile physical address,
        (b) a set of most significant bits of a volatile physical address,
        (c) flags comprising a non-volatile memory flag and a volatile memory flag;
    transmitting the flags from the set of entries to a select block to select at most one set of the most significant bits of the non-volatile physical address and at most one set of the most significant bits of the volatile physical address; and
    merging the least significant bits portion with at least one of the at most one set of the most significant bits of the non-volatile physical address and at most one set of the most significant bits of the volatile physical address.

2. The method of claim 1, further comprising receiving the logical address from a host system via a bridge.

3. The method of claim 1, further comprising retrieving content from a location within a non-volatile memory according to a derived non-volatile physical address, wherein merging the least significant bits portion comprises deriving the derived non-volatile physical address.

4. The method of claim 1, further comprising retrieving content from a location within a volatile memory according to a derived volatile physical address, wherein merging the least significant bits portion comprises deriving the derived volatile physical address.

5. The method of claim 1 further comprising:
    writing content to a location within a volatile memory according to a derived volatile physical address, wherein merging the least significant bits portion comprises deriving the derived volatile physical address, and
    updating a volatile memory flag of the set of entries.

6. The method of claim 1, further comprising:
    writing content to a location within a non-volatile memory according to a derived non-volatile physical address, wherein merging the least significant bits portion comprises deriving the derived non-volatile physical address, and
    updating a non-volatile memory flag of the set of entries.

7. A storage system communicatively coupled with a host system, the storage system comprising:
    an array of non-volatile memories;
    an internal volatile memory;
    multiple address translation tables each having multiple entries, wherein content in each entry comprises a non-volatile physical address portion, a volatile physical address portion, a valid flag, and a cache valid flag; and
    an internal processing unit communicatively coupled with the host system, and configured to:
        receive, from the host system, a command comprises a logical address,
        divide the logical address into a most significant bits portion and a least significant bits portion,
        transmit the most significant bits portion to multiple address translation tables;
        retrieving a set of entries comprising an entry from each of the multiple address translation tables, wherein each of the set of entries comprises:
            (a) a set of most significant bits of a non-volatile physical address,
            (b) a set of most significant bits of a volatile physical address, and
            (c) flags comprising a non-volatile memory flag and a volatile memory flag;
        transmit the flags from the set of entries to a select block to select at most one set of the most significant bits of the non-volatile physical address and at most one set of the most significant bits of the volatile physical address; and
        merge the least significant bits portion with at least one of the at most one set of the most significant bits of the non-volatile physical address and at most one set of the most significant bits of the volatile physical address.

8. The storage system of claim 7, further comprising a host system north bridge that transmits the logical address to the internal processing unit.

9. The storage system of claim 8, further comprising a host system south bridge that transmits the logical address to the internal processing unit.

10. The storage system of claim 7, wherein the internal processing unit is further configured to retrieve content from a location within a non-volatile memory according to a derived non-volatile physical address, wherein merging the least significant bits portion comprises deriving the derived non-volatile physical address.

11. The storage system of claim 7, wherein the internal processing unit is further configured to retrieve content from a location within a volatile memory according to a derived volatile physical address, wherein merging the least significant bits portion comprises deriving the derived volatile physical address.

12. The storage system of claim 7 wherein the internal processing unit is further configured to:
write content to a location within a volatile memory according to a derived volatile physical address, wherein merging the least significant bits portion comprises deriving the derived volatile physical address, and
update a volatile memory flag of the set of entries.

13. The storage system of claim 7, wherein the internal processing unit is further configured to:
write content to a location within a non-volatile memory according to a derived non-volatile physical address, wherein merging the least significant bits portion comprises deriving the derived non-volatile physical address, and
update a non-volatile memory flag of the set of entries.

14. The storage system of claim 7, wherein the internal processing unit is further configured to use a cache translator block and a merger block to merge the least significant bits portion.

* * * * *